(12) United States Patent
Park et al.

(10) Patent No.: US 9,375,869 B2
(45) Date of Patent: Jun. 28, 2016

(54) MANUFACTURING METHOD AND APPARATUS FOR FRP BAR USING ROTATIONAL NOZZLE, AND NOZZLE FOR SUCH APPARATUS

(71) Applicant: KOREA INSTITUTE OF CONSTRUCTION TECHNOLOGY, Goyang-si, Gyeonggi-do (KR)

(72) Inventors: Ki Tae Park, Goyang-si (KR); Hyeong Yeol Kim, Goyang-si (KR); Young Jun You, Goyang-si (KR); Sang Yoon Lee, Goyang-si (KR); Dong Woo Seo, Cheongju-si (KR); Tae Heon Kim, Pyeongtaek-si (KR); Ji Hyun Hwang, Seoul (KR)

(73) Assignee: KOREA INSTITUTE OF CONSTRUCTION TECHNOLOGY, Goyang-Si (KR)

( * ) Notice: Subject to any disclaimer, the term of this patent is extended or adjusted under 35 U.S.C. 154(b) by 0 days.

(21) Appl. No.: 14/466,828

(22) Filed: Aug. 22, 2014

(65) Prior Publication Data

US 2015/0069653 A1 Mar. 12, 2015

(30) Foreign Application Priority Data

Sep. 12, 2013 (KR) .......................... 10-2013-0109665

(51) Int. Cl.
*B29C 47/02* (2006.01)
*B29C 47/30* (2006.01)
(Continued)

(52) U.S. Cl.
CPC ............ *B29C 47/0016* (2013.01); *B29C 47/065* (2013.01); *B29C 47/1081* (2013.01); *B29C 70/521* (2013.01); *B29C 47/1027* (2013.01); *B29C 47/266* (2013.01); *B29C 47/268* (2013.01);
(Continued)

(58) Field of Classification Search
CPC B29C 47/266; B29C 47/268; B29C 47/0016; B29C 47/027; B29C 47/30; B29C 70/521; B29D 99/0046; F16C 7/026; F16C 7/06
USPC ......................................... 264/176.1; 425/381
See application file for complete search history.

(56) References Cited

U.S. PATENT DOCUMENTS 4,770,834 A 9/1988 Nakasone et al.
5,632,837 A * 5/1997 Carmien .................. B25G 1/10
156/172

(Continued)

FOREIGN PATENT DOCUMENTS

JP 5-076546 U 10/1993
KR 10-1987-0003861 5/1987
(Continued)

*Primary Examiner* — Alison L Hindenlang
*Assistant Examiner* — Mohamed K Ahmed Ali
(74) *Attorney, Agent, or Firm* — Fenwick & West LLP

(57) ABSTRACT

A rod-shaped FRP bar is manufactured with a fiber and a resin by using a nozzle 100 which includes an outer nozzle 11 having a penetration hole at its center and a plurality of middle nozzles 12 disposed at an inlet of the outer nozzle 11 so that one middle nozzle is located inside another middle nozzle with an interval. Fibers are supplied through a center hole of the middle nozzle located at an innermost location, through intervals between the middle nozzles and through intervals between the middle nozzles and the outer nozzle, thereby making a hybrid FRP bar 1 having a section in which the fibers configure a plurality of fiber distribution layers from the center of the FRP bar toward the outside.

2 Claims, 11 Drawing Sheets

(51) Int. Cl.
  *B29D 99/00* (2010.01)
  *B29C 47/00* (2006.01)
  *B29C 70/52* (2006.01)
  *B29C 47/06* (2006.01)
  *B29K 305/00* (2006.01)
  *B29C 47/10* (2006.01)
  *B29C 47/26* (2006.01)
  *B29K 307/04* (2006.01)
  *B29K 309/08* (2006.01)
  *B29L 9/00* (2006.01)
  *E04C 5/08* (2006.01)

(52) U.S. Cl.
  CPC ......... *B29K 2305/00* (2013.01); *B29K 2307/04* (2013.01); *B29K 2309/08* (2013.01); *B29L 2009/00* (2013.01); *E04C 5/085* (2013.01)

(56) References Cited

U.S. PATENT DOCUMENTS

2009/0065969 A1\* 3/2009 Perera ................... D01D 5/30
  264/172.15
2014/0117578 A1 5/2014 Kim et al.

FOREIGN PATENT DOCUMENTS

| KR | 20-1989-0008949 Y1 | 5/1989 |
| KR | 10-0702629 | 4/2007 |
| KR | 10-1311999 B1 | 9/2013 |

\* cited by examiner

MANUFACTURING METHOD AND APPARATUS FOR FRP BAR USING ROTATIONAL NOZZLE, AND NOZZLE FOR SUCH APPARATUS

CROSS-REFERENCE TO RELATED APPLICATION

This application claims priority to Korean Patent Application No. 10-2013-0109665, filed on Sep. 12, 2013, and all the benefits accruing therefrom under 35 U.S.C. §119, the contents of which in its entirety are herein incorporated by reference.

BACKGROUND

1. Field

The present invention relates to a manufacturing method and an apparatus for a fiber reinforced polymer (FRP) bar, and more particularly, to a manufacturing method and an apparatus for a FRP bar which does not cause excessive bending deflection even though a fiber having a low elastic modulus is used, by introducing a compression force in advance. In addition, the present invention relates to a method and an apparatus for manufacturing a hybrid FRP bar by using at least two kinds of fibers so that the fibers may be easily distributed to specific locations at the section of the manufactured hybrid FRP bar, and a nozzle for such an apparatus.

2. Description of the Related Art

A steel bar used for a reinforced concrete structure is always exposed to possibility of corrosion. A steel bar in concrete is highly likely to contact moisture due to cracks or the like, and in particular, the steel bar is corroded due to residual moisture in the concrete, in addition to cracks. When the steel bar is corroded, the volume of the steel bar expands, which results in separation of concrete cover. Therefore, the reinforced concrete structure loses integrity, which is an essential requirement of the reinforced concrete structure, and is not able to serve as a structural member.

In order to solve this problem, rod-shaped products manufactured using a fiber reinforced polymer (FRP) have been used instead of steel bars distributed in a concrete structure or to assist the steel bars. Such a rod-shaped product manufactured using FRP is generally called "FRP bar" or "FRP rebar" since it is used for reinforcing a concrete structure.

Korean Patent Registration No. 10-0702629 and Korean Unexamined Patent Publication No. 10-1987-3861 disclose a technique for manufacturing such a FRP bar. In the prior art, a FRP bar is manufactured by a manufacturing apparatus including a fiber winding reel, a resin supplier, a nozzle, a heater and a drawer. In order to manufacture the FRP bar, first, fibers as thin as threads, supplied from the fiber winding reel, are bound into a bundle and drawn to the drawer. In this time, while passing through the resin supplier, the fibers are formed into a rod shape while entering the nozzle together with a resin, and the resin is hardened through the heater, thereby making the FRP bar.

The fibers used for manufacturing a rod-shaped FRP bar having a circular, oval or polygonal section by bundling the fibers impregnated in a resin as described above use carbon fibers, aramid fibers, steel wires, glass fibers or the like, among which glass fibers are advantageous for cost reduction. However, when the FRP bar is manufactured using glass fibers, the glass fibers have a lower elastic modulus than the steel bar even though its tensile strength is much greater than that of the steel bar. Therefore, if the FRP bar is used for reinforcing a bending member, a great drooping is caused at the bending member. In other words, if the FRP bar is manufactured using a fiber having a low elastic modulus such as a glass fiber, an excessive bending deflection is caused at a concrete structure to which a bending load is applied.

As a solution, there has been proposed a technique for manufacturing a FRP bar by mixing several kinds of fibers having different elastic modulus. The FRP bar manufactured using several kinds of fibers together may be called a "hybrid FRP bar". The hybrid FRP bar may ensure good economical feasibility since several kinds of fibers are mixed, thereby ensuring more improved elastic modulus in comparison to a FRP using only glass fibers. The hybrid FRP bar may use, for example, a glass fiber having a low elastic modulus and a carbon fiber having a high elastic modulus.

When manufacturing a hybrid FRP bar by using several kinds of fibers, it may be needed to distribute the several kinds of fibers at different locations in the section of the FRP bar. If the hybrid FRP bar uses a glass fiber and a carbon fiber as in the above example, it may be needed to locate the glass fiber at the center of the section and the carbon fiber at the periphery of the section.

The fibers used for manufacturing a FRP bar have a very small diameter like threads, and several ten or hundred fibers are bound for use. If there is proposed a technique capable of effectively manufacturing a hybrid FRP bar in a state where several kinds of such fibers are used and also each kind of fiber is distributed at a specific location on the section of the FRP bar as designed, the hybrid FRP bar will be efficiently used suitable for a stress situation or other use conditions.

SUMMARY

The present invention is directed to providing a FRP bar which does not cause excessive bending deflection even though it is used for a concrete structure to which a bending load is applied.

Further, the present invention is directed to providing a manufacturing method for a hybrid FRP bar using at least two kinds of fibers which are distributed at specific locations of the section of the hybrid FRP bar as designed, and a manufacturing apparatus therefor.

In addition, the present invention is directed to providing a manufacturing method for a hybrid FRP bar using at least two kinds of fibers so that a fiber distribution pattern in the section of the hybrid FRP bar may be easily changed as designed, and a manufacturing apparatus therefor.

In one aspect, the present invention provides a manufacturing apparatus for a rod-shaped fiber reinforced polymer (FRP) bar composed of a fiber and resin, the manufacturing apparatus comprising a fiber winding reel, a resin supplier, a nozzle and a drawer, wherein the nozzle includes a pipe-shaped outer nozzle having a penetration hole formed at its center and a plurality of middle nozzles disposed at an inlet of the outer nozzle and disposed so that one middle nozzle is located inside another middle nozzle; wherein dividing members are disposed at an interval between the middle nozzle and the outer nozzle and an interval between the middle nozzles so that one end of the dividing member is inserted into an insert groove formed in an inner surface of the outer nozzle or an inner surface of the middle nozzle to include an elastic member therein and the other end of the dividing member is located in a hooking groove formed in an outer surface of the middle nozzle opposite thereto, the location of the dividing member being changed by a rotation of the middle nozzle; and wherein a fiber is supplied through a central hole of the middle nozzle located at an innermost side, a fiber is supplied through regions divided in a circumferential direction by the dividing member in the interval of the middle nozzles, and a fiber is supplied through a region divided in a circumferential direction by the dividing member in the interval between the middle nozzle and the outer nozzle, thereby manufacturing a hybrid FRP bar having a section in which the fibers form a greater number of fiber distribution layers from a center of the FRP bar to the outside and are also distinguishably distributed in each fiber distribution layer in a circumferential direction, wherein if the location of the dividing member is changed by a rotation of the middle nozzle, a hybrid FRP bar is manufactured so that locations of a plurality of regions divided in a circumferential direction in each fiber distribution layer are changed.

Meanwhile, in other aspect, the present invention provides a manufacturing method for a FRP rod using the FRP rod manufacturing apparatus described above, and a nozzle therefor.

In particular, the present invention provides a manufacturing method for a FRP rod using the FRP rod manufacturing apparatus described above, in which a fiber supplied through a central hole of the middle nozzle located at an innermost side, a fiber supplied through the interval of the middle nozzles, and a fiber supplied through the interval between the middle nozzle and the outer nozzle are different from each other, thereby manufacturing a hybrid FRP bar having a section in which different kinds of fibers are distributed in a plurality of fiber distribution layers, respectively.

In addition, the present invention provides a manufacturing method for a FRP rod using the FRP rod manufacturing apparatus described above, in which different kinds of fibers are supplied to regions divided in a circumferential direction by the dividing member in the interval between the middle nozzle and the outer nozzle and in the interval of the middle nozzles, thereby manufacturing a hybrid FRP bar having a section in which different kinds of fibers are distributed in a circumferential direction in each fiber distribution layer.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
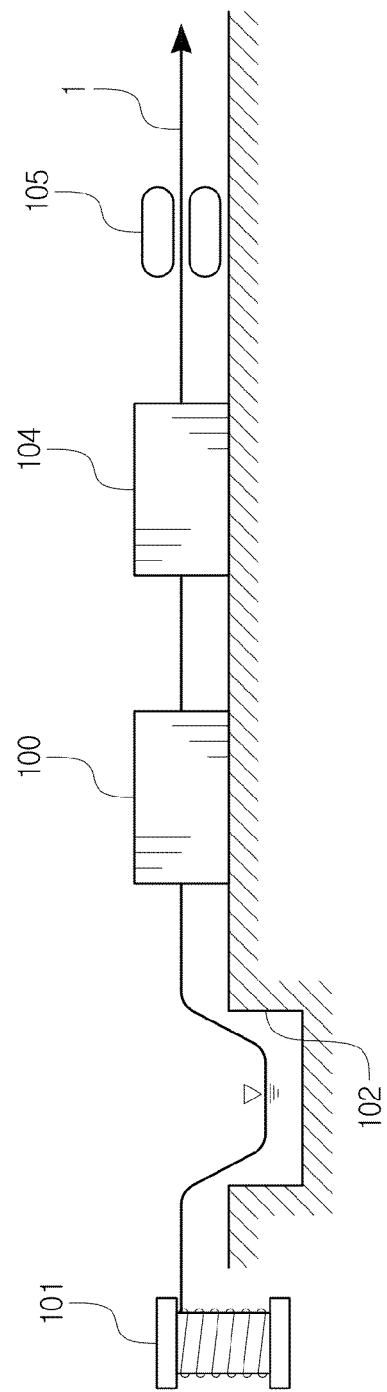
FIG. 1 is a schematic diagram showing a manufacturing apparatus for a hybrid FRP bar according to the present invention.

Hereinafter, an embodiment of the present invention will be described with reference to the accompanying drawings. Even though the present invention is based on the embodiments depicted in the drawings, it is just for better understanding, and the spirit, essential configurations and operations of the present invention are not limited thereto.

In the present invention, fibers impregnated in the resin are bundled and drawn to make a fiber reinforced polymer (FRP) bar. For this, similar to the prior art, a manufacturing apparatus for a FRP bar according to the present invention may include a fiber winding reel 101, a resin supplier 102, a nozzle 100 and a drawer 105.

FIG. 1 is a schematic diagram showing a manufacturing apparatus for a hybrid FRP bar according to the present invention. As shown in FIG. 1, the manufacturing apparatus for a hybrid FRP bar according to the present invention includes a fiber winding reel 101, a resin supplier 102, a nozzle 100 and a drawer 105. Fibers as thin as threads and supplied from the fiber winding reel 101 are bounded into a bundle and drawn to the drawer 105. In this time, while passing through the resin supplier 102, the fibers are formed into a rod shape while entering the nozzle together with a resin, thereby manufacturing the hybrid FRP bar. In the present invention, the resin may be hardened using a heater 104, if necessary.

In the present invention, a fiber used for manufacturing the FRP bar may be a carbon fiber, an aramid fiber, a glass fiber or the like, and a steel wire such as a piano wire may also be used. Therefore, in the disclosure of this specification, the term "fiber" mentioned as material of the FRP bar should be understood as including a steel wire such as a piano wire in addition to the carbon fiber, the aramid fiber, the glass fiber and other fibers made of synthetic resins or other various materials.

In the manufacturing apparatus and the manufacturing method for a FRP bar according to the present invention, the nozzle 100 for bundling fibers impregnated in a resin into a rod shape with a designed sectional size has the following configuration. In detail, FIG. 2 is a schematic perspective view showing the nozzle 100 according to an embodiment of the present invention, FIG. 3 is a schematic perspective sectional view showing the nozzle 100 of FIG. 2, taken along the line A-A.

Figure 2:
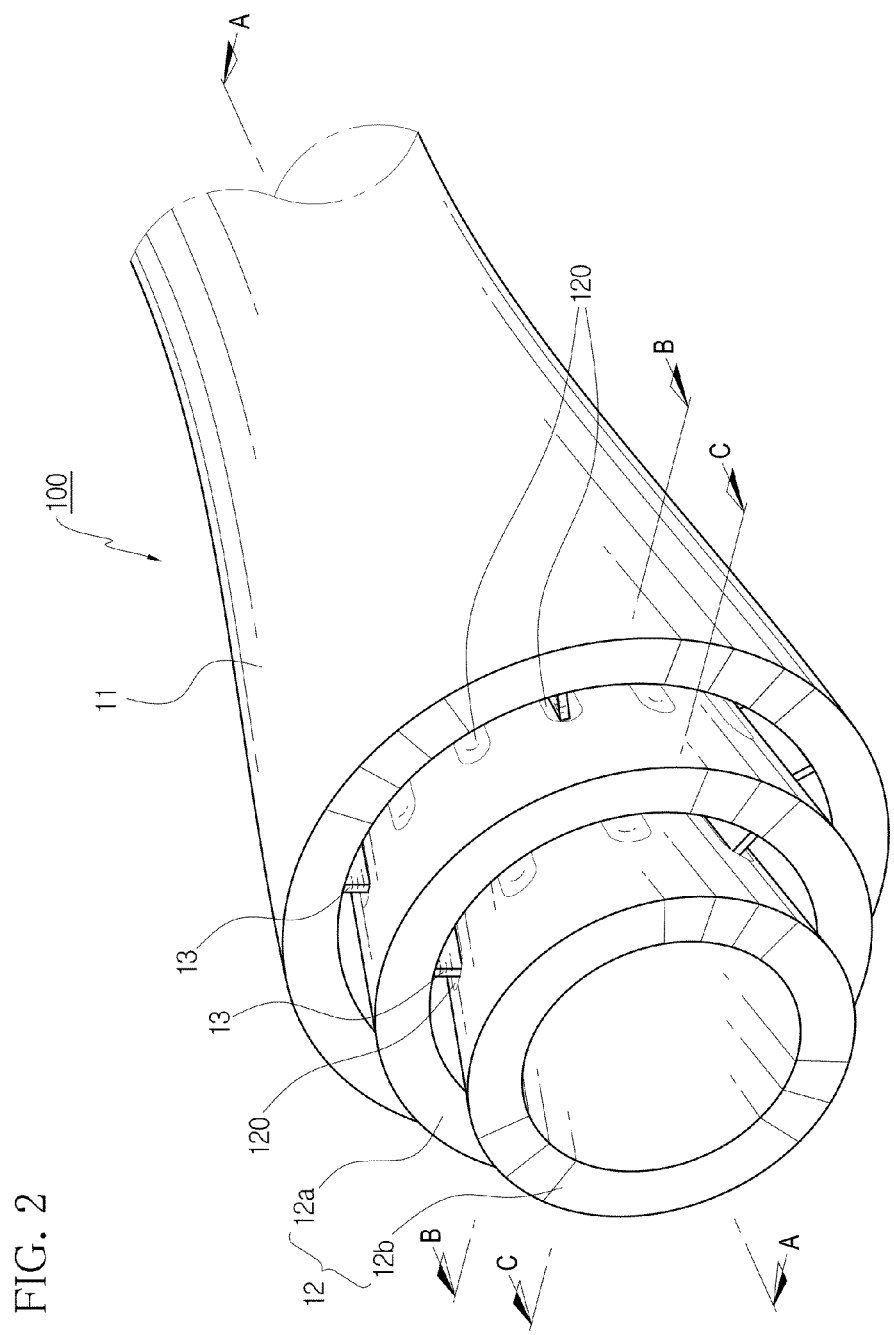
FIG. 2 is a schematic perspective view showing a nozzle according to an embodiment of the present invention.
Figure 3:
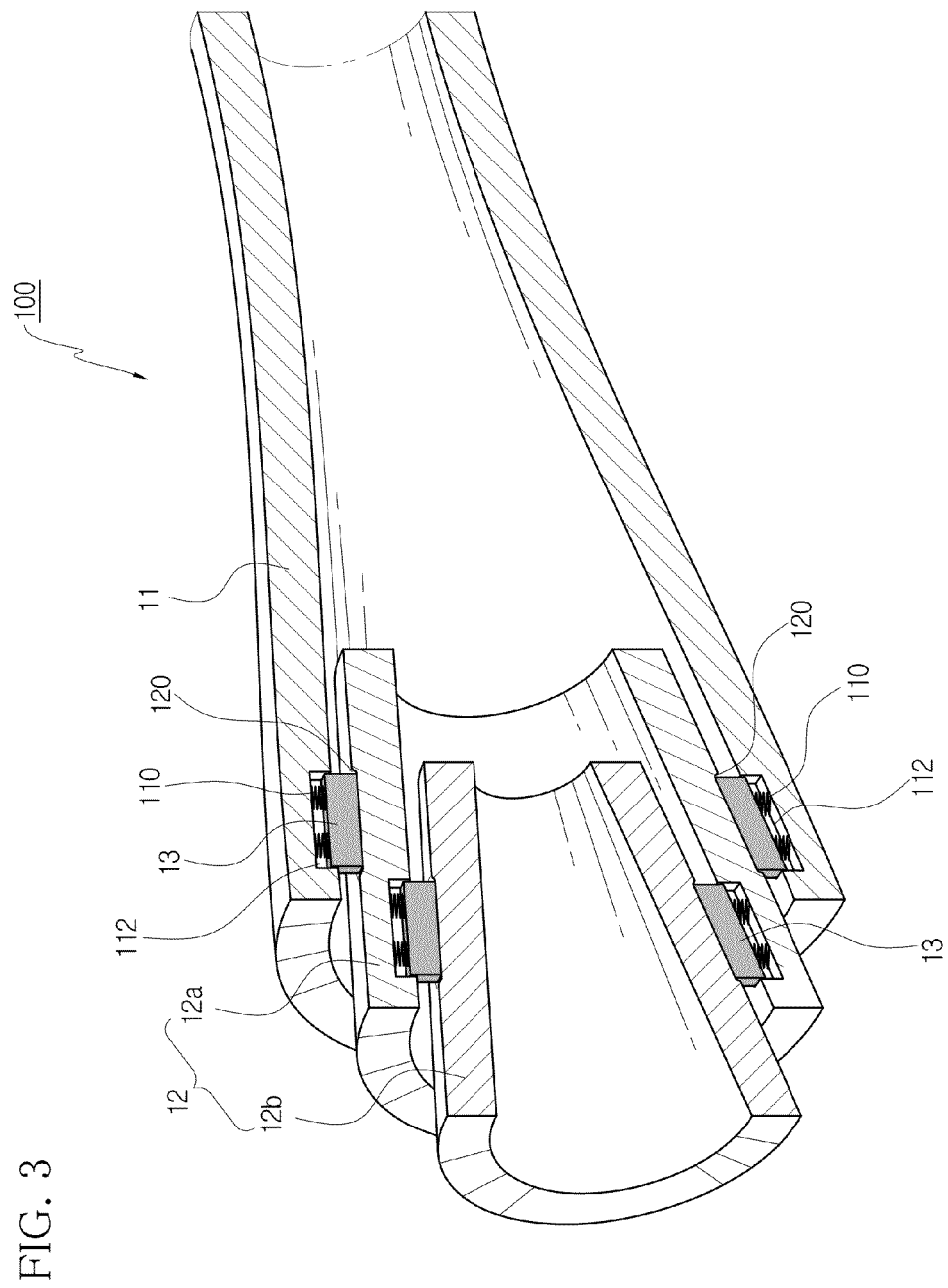
FIG. 3 is a schematic perspective view showing a side section of the nozzle depicted in FIG. 2, taken along the line A-A.
Figure 4:
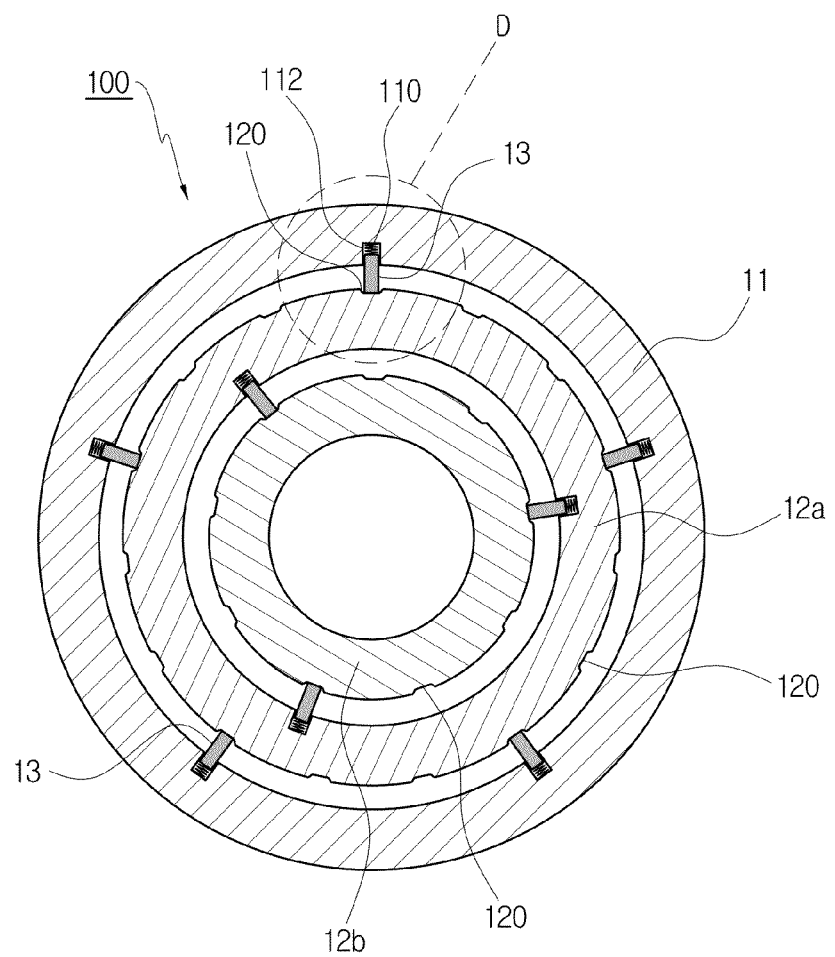
FIG. 4 is a schematic sectional view, taken along the line B-B of FIG. 2, showing a sectional configuration of the nozzle toward an inlet where a fiber is input.
Figure 5:
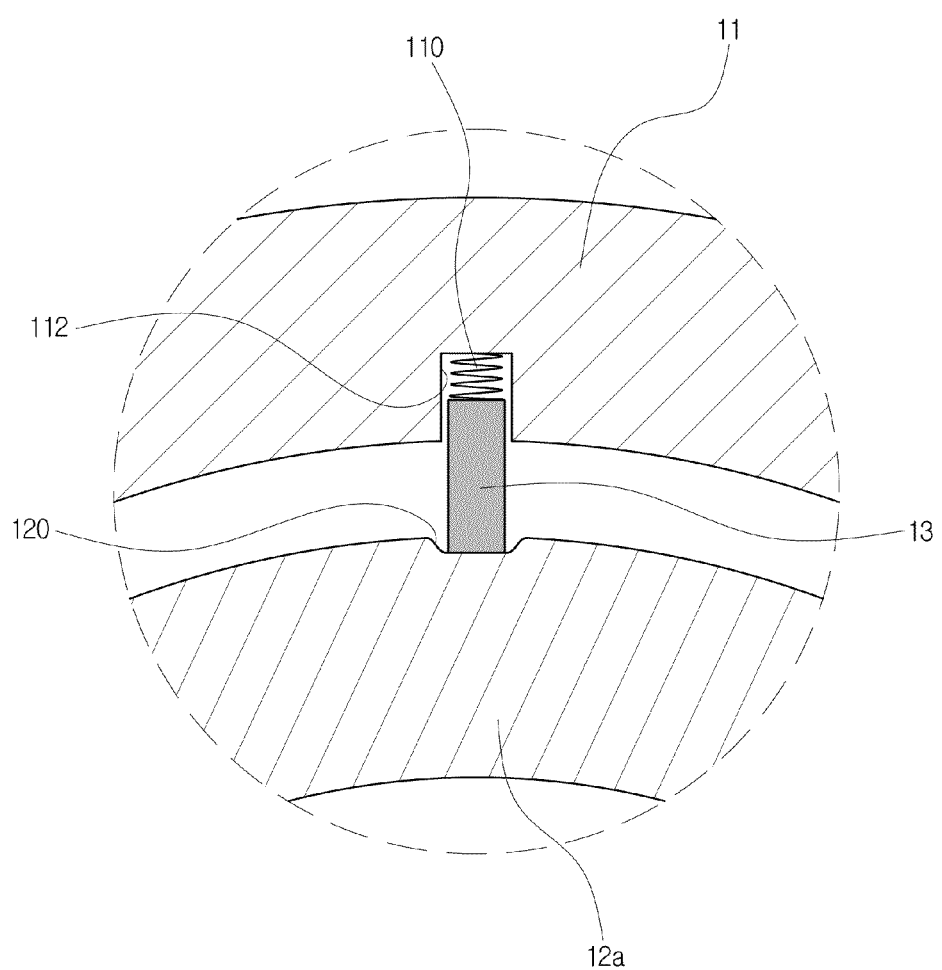
FIG. 5 is a schematic enlarged view showing the circular D portion of FIG. 4.
Figure 6:
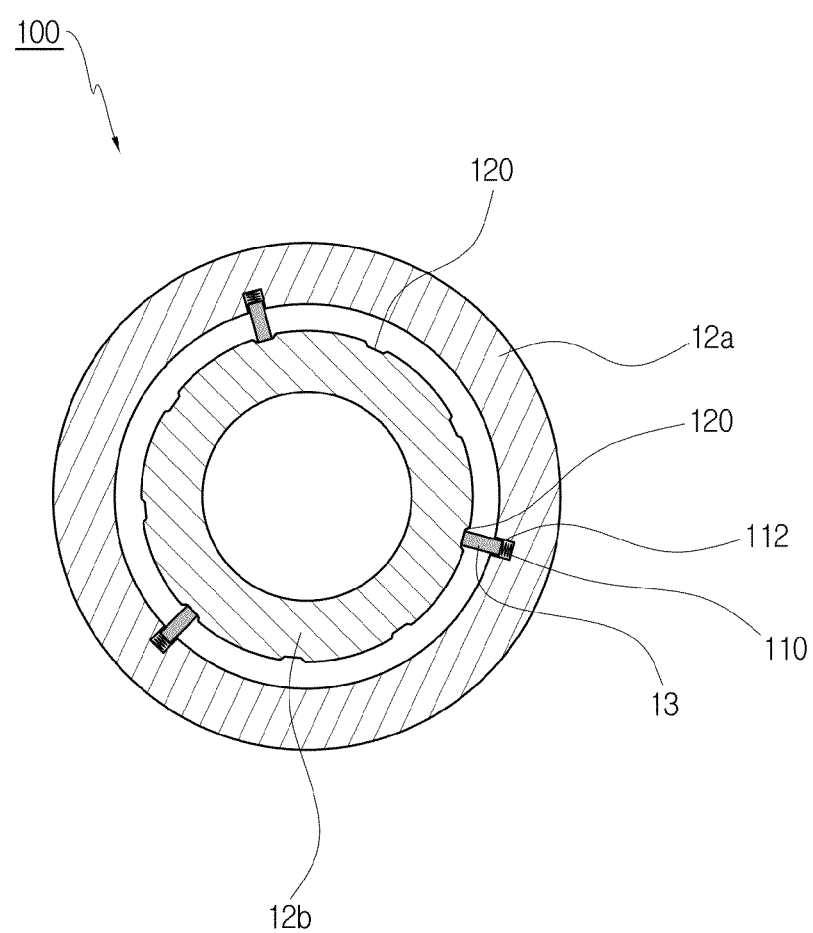
FIG. 6 is a schematic sectional view, taken along the line C-C of FIG. 2, showing a sectional configuration of the nozzle toward the inlet where a fiber is input.

FIG. 4 is a schematic sectional view, taken along the line B-B of FIG. 2, showing a sectional configuration of the nozzle 100 toward an inlet where a fiber is input, and FIG. 5 is a schematic enlarged view showing the circular D portion of FIG. 4. In addition, FIG. 6 is a schematic sectional view, taken along the line C-C of FIG. 2, showing a sectional configuration of the nozzle 100 toward the inlet where a fiber is input.

As shown in the figures, in the present invention, the nozzle 100 is configured to include a pipe-shaped outer nozzle 11 having a penetration hole formed at its center and having an inlet with a greater sectional area than an outlet, and a plurality of middle nozzles 12 disposed at the inlet of the outer nozzle 11 and disposed so that one middle nozzle is located inside another middle nozzle. There may be provided a plurality of middle nozzles 12. In the embodiment depicted in the drawings, two middle nozzles 12 are provided. In this specification, when the plurality of middle nozzles 12 is mentioned, a reference symbol '12' is used thereto. However, when two middle nozzles are separately mentioned, they are respectively called a 'first middle nozzle 12a' and a 'second middle nozzle 12b', from the outer nozzle 11.

The outer nozzle 11 is made of a pipe-shaped member having a penetration hole formed at its center. The inlet of the outer nozzle 11 through which a fiber enters may have a greater sectional area than the outlet of the outer nozzle 11 through which a fiber is drawn out. In this configuration, when a fiber entering the inlet is pulled by the drawer to discharge through the outlet, a very strong frictional force is applied between the inner surface of the outer nozzle 11 and the fiber. Accordingly, the fiber discharging from the outlet of the outer nozzle 11 is provided with a tensile force. In other words, the fiber is in a pre-strained state. The fiber in such a pre-strained state is hardened together with the rein. In the state where the resin is hardened, the fiber is cut into a necessary length by a cutter (not shown), thereby making the FRP bar 1. Therefore, the fiber which has been already pulled while passing through the nozzle 100 has a tendency of shrinking again due to elasticity, namely an elastic restoring force, and accordingly a compression force is introduced to the FRP bar.

If the FRP bar of the present invention is used for a concrete structure serving as a bending member, the tensile force applied to the FRP bar by a bending stress is offset by the compression force introduced in advance, and therefore it is possible to prevent excessive bending deflection.

Meanwhile, in the present invention, when a fiber is supplied to the inlet of the outer nozzle 11, the middle nozzle 12 may allow the fiber to be supplied in a state of being distinguished into a plurality of layers. The first middle nozzle 12a has an outer size smaller than the inlet of the outer nozzle 11, and an interval may be present between the inner surface of the outer nozzle 11 and the outer surface of the first middle nozzle 12a. In other words, the first middle nozzle 12a is located inside the inlet of the outer nozzle 11. In particular, in the embodiment depicted in the figures, the first middle nozzle 12a has a corn shape which is tapered so that the inlet has a greater sectional size than the outlet, similar to the outer nozzle 11.

The first middle nozzle 12a is disposed inside the outer nozzle 11 with an interval as described above, and then a second middle nozzle 12b is disposed inside inlet of the first middle nozzle 12a with an interval. In other words, similar to the arrangement of the outer nozzle 11 and the first middle nozzle 12a, the second middle nozzle 12b has a smaller outer size than the inlet of the first middle nozzle 12a, and thus the second middle nozzle 12b is located inside the inlet of the first middle nozzle 12a so that an interval is present between the inner surface of the first middle nozzle 12a and the outer surface of the second middle nozzle 12b. In the embodiment depicted in the drawings, the second middle nozzle 12b also has a corn shape which is tapered so that the inlet has a greater sectional size than the outlet.

In the embodiment depicted in the figures, just two middle nozzles including the first middle nozzle 12a and the second middle nozzle 12b are provided. However, if required, more middle nozzles such as a third middle nozzle, a fourth middle nozzle or the like may be further arranged. In this case, the third middle nozzle, the fourth middle nozzle or the like may be provided by repeating the process of disposing the second middle nozzle 12b in the first middle nozzle 12a. In other words, when a plurality of middle nozzles is provided, an inner middle nozzle is disposed at the inlet of an outer middle nozzle so that an interval is present between both middle nozzles.

In the present invention, dividing members 13 are installed in a radial direction between the inner surface of the outer nozzle 11 and the outer surface of the first middle nozzle 12a so that the outer nozzle 11 and the first middle nozzle 12a are disposed to have an interval between them. In addition, dividing members 13 are also installed between the inner surface of the first middle nozzle 12a and the outer surface of the second middle nozzle 12b, respectively, so that the outer nozzle 11 and the first middle nozzle 12a may also have an interval between them. In other words, the dividing members 13 are installed between the middle nozzles 12.

In the present invention, a plurality of dividing members 13 may be respectively provided between the inner surface of the outer nozzle 11 and the outer surface of the first middle nozzle 12a and between the middle nozzles. In particular, in the present invention, the dividing member 13 is configured to be shrinkable and extendable in a radial direction.

In the nozzle 100 according to the embodiment depicted in FIGS. 2 to 6, the dividing members 13 provided between the inner surface of the outer nozzle 11 and the outer surface of the first middle nozzle 12a are made of a plate member with a predetermined thickness, and its one side toward an outside in a radial direction is coupled to the inner surface of the outer nozzle 11 to be inserted into the outer nozzle 11 for shrinkage and expansion therein. For example, a concave insert groove 112 is formed in the inner surface of the outer nozzle 11, and an elastic member 110 such as a spring is provided in the insert groove 112. In addition, one side of the dividing member 13 coupled to the elastic member 110 is inserted into the insert groove 112 and coupled to the inner surface of the outer nozzle 11.

The other end of the dividing member 13 is oriented toward the outer surface of the first middle nozzle 12a. Here, a concave hooking groove 120 is formed in the outer surface of the first middle nozzle 12a which contacts the other end of the dividing member 13 so that the other end of the dividing member 13 is located in the hooking groove 120. As described later, the hooking groove 120 may be formed to have a curved inner surface so that, if the first middle nozzle 12a is rotated, the other end of the dividing member 13 may be easily released from the hooking groove 120 or easily inserted into the hooking groove 120. A plurality of hooking grooves 120 are formed in the outer surface of the first middle nozzle 12a along a circumference of the first middle nozzle 12a at intervals.

In the nozzle 100 according to the embodiment depicted in FIGS. 2 to 6, the dividing members 13 provided between the inner surface of first middle nozzle 12a and the outer surface of the second middle nozzle 12b and between the middle nozzles are configured as above. In other words, the dividing members 13 provided between the inner surface of first middle nozzle 12a and the outer surface of the second middle nozzle 12b is also made of a plate member with a predetermined thickness, and its one side toward an outside in a radial direction is coupled to the inner surface of the first middle nozzle 12a to be inserted into the first middle nozzle 12a for shrinkage and expansion therein. For this, as described above, a concave insert groove 112 is formed in the inner surface of the first middle nozzle 12a, and an elastic member 110 is provided in the insert groove 112. In addition, one side of the dividing member 13 may be coupled to the elastic member 110 and inserted into the insert groove 112.

A concave hooking groove 120 is formed in the outer surface of the second middle nozzle 12b which contacts the other end of the dividing member 13 so that the other end of the dividing member 13 coupled to the first middle nozzle 12a is located in the hooking groove 120. The hooking groove 120 formed in the outer surface of the second middle nozzle 12b may also have a curved inner surface, and a plurality of hooking grooves 120 are formed in the outer surface of the second middle nozzle 12b along a circumference at intervals.

In this way, the dividing member 13 may be formed between the middle nozzles 12, respectively.

Figure 7:
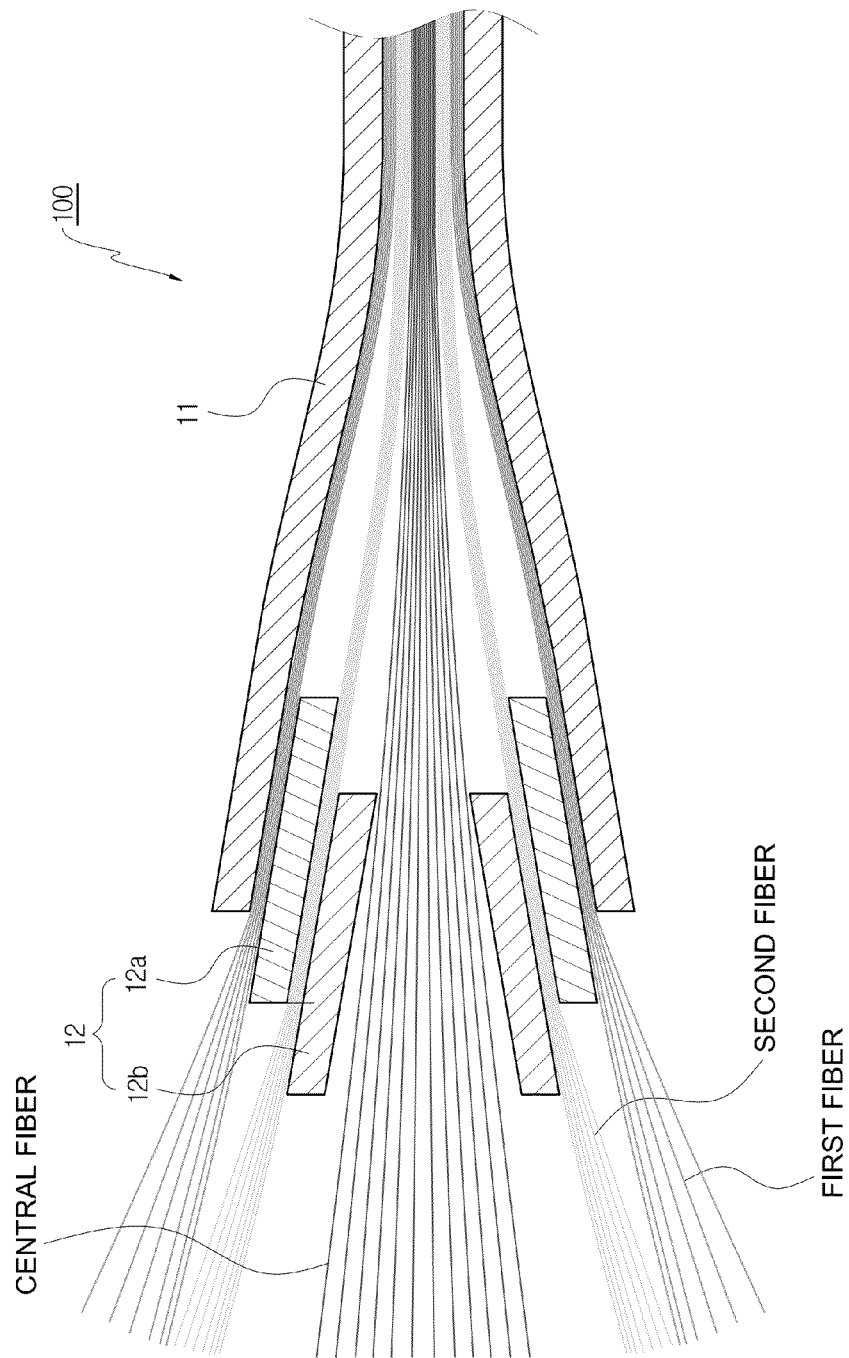
FIG. 7 is a schematic sectional view, taken along the line A-A of FIG. 2, showing a state where several kinds of fibers are supplied to the nozzle of the present invention.

FIG. 7 is a schematic sectional view, taken along the line A-A of FIG. 2, showing a state where several kinds of fibers are supplied to the nozzle 100 of the present invention. Fibers are supplied to the nozzle 100 of the present invention, in which the outer nozzles 11 and the middle nozzles 12 are disposed at intervals therein in order, as shown in FIG. 7. In order to show a fiber supply state more clearly, the dividing member 13 is not depicted in FIG. 7.

As shown in FIG. 7, a fiber is supplied straightly to the center hole of the middle nozzle present at an innermost side (the second middle nozzle in the embodiment depicted in the figures). In addition, a fiber is also supplied through an interval present between the middle nozzles 12 (the interval between the first middle nozzle and the second middle nozzle in the embodiment depicted in the figures). Moreover, a fiber is also supplied through an interval between the middle nozzle 12 and the outer nozzle 11 (the interval between the outer nozzle and the first middle nozzle in the embodiment depicted in the figures). When being observed on the section, the fibers supplied through several intervals as described above configure a plurality of layers, and discharge through the central penetration holes of the outer nozzle 11 and are drawn out.

In the present invention, the dividing members 13 made of a plate member and extending in a radial direction are disposed between the outer nozzle 11 and the middle nozzle 12 and between the middle nozzles 12, and the dividing member 13 also serves as a dividing means for distinguishing the kinds of fibers in a circumferential direction. Since a plurality of dividing members 13 are provided between the outer nozzle 11 and the first middle nozzle 12a, the interval between the outer nozzle 11 and the first middle nozzle 12a are substantially divided into a plurality of inlets along the circumference. This is also identically applied to the interval between the first middle nozzle 12a and the second middle nozzle 12b. In other words, a plurality of dividing members 13 are also provided between the first middle nozzle 12a and the second middle nozzle 12b so that the interval between them is divided into a plurality of inlets.

Figure 8:
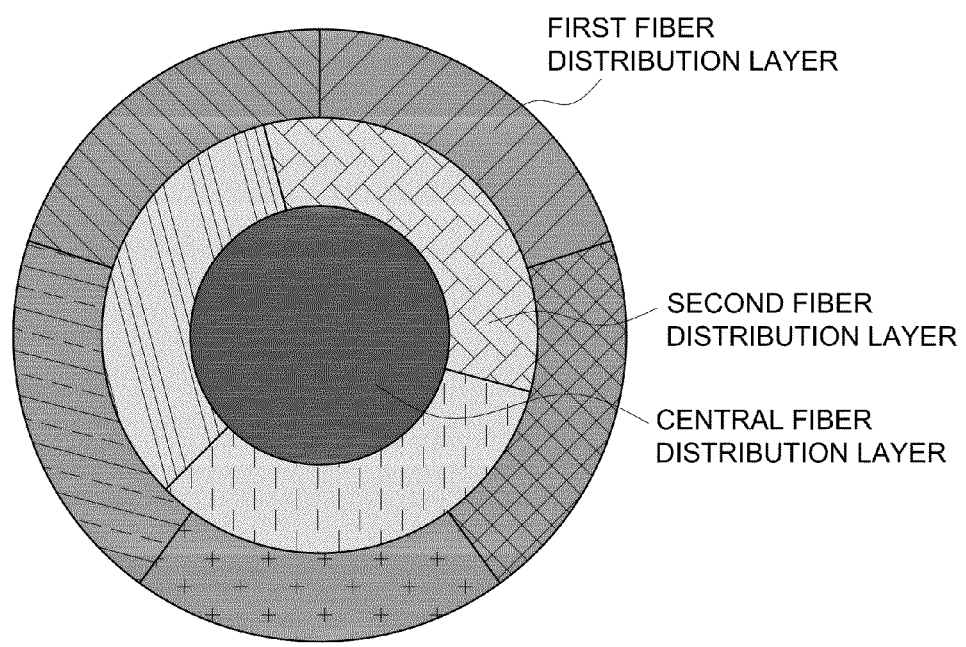
FIG. 8 is a schematic sectional view showing a hybrid FRP bar, manufactured using the nozzle of the present invention to include a plurality of fiber distribution layers and a circular section divided into a plurality of regions in a circumferential direction.

FIG. 8 is a schematic sectional view showing a hybrid FRP bar 1, which is manufactured to have a circular section by supplying different kinds of fibers to a plurality of regions divided by the dividing members 13 in the nozzle 100 of the present invention. In the sectional view of FIG. 8, different shades or shapes represent different kinds of fibers distributed. As shown in FIG. 8, fibers supplied through the interval between the outer nozzle 11 and the first middle nozzle 12a are distributed in a first fiber distribution layer serving as an outermost layer of the hybrid FRP bar 1, fibers supplied through the interval between the first middle nozzle 12a and the second middle nozzle 12b are distributed in a second fiber distribution layer located at an inner side of the first fiber distribution layer, and fibers supplied through the central hole of the second middle nozzle 12b are distributed in a central fiber distribution layer located at the center. Here, if different kinds of fibers are supplied to the inlets divided by the dividing members 13, respectively, the fibers may be distinguished by a plurality of fiber distribution layer at the section of the hybrid FRP bar 1, and different kinds of fibers may also be distinguishably distributed in each fiber distribution layer along the circumference. In other words, in the present invention, it is possible to manufacture a hybrid FRP bar having a section in which different kinds of fibers are distinguishably distributed in each fiber distribution layer along the circumference.

For example, if a hybrid FRP bar composed of three kinds of fibers, namely glass fibers, aramid fibers and carbon fibers, is manufactured, a hybrid FRP bar including a central fiber distribution layer in which glass fibers are distributed, a second fiber distribution layer in which aramid fibers are distributed, and a first fiber distribution layer in which carbon fibers are distributed may be very easily manufactured by supplying the glass fibers through the center of the second middle nozzle 12b, supplying the aramid fibers through the interval between the first middle nozzle 12a and the second middle nozzle 12b, and supplying the carbon fibers through the interval between the outer nozzle 11 and the first middle nozzle 12a. In addition, a hybrid FRP bar having at least two kinds of fibers is manufactured by supplying different colors or kinds of fibers to the inlets divided by the dividing members 13 in a circumferential direction for the first fiber distribution layer and the second fiber distribution layer, respectively. Here, a hybrid FRP bar in which fibers are distributed at specific locations in the section thereof as desired may be easily manufactured.

Figure 9:
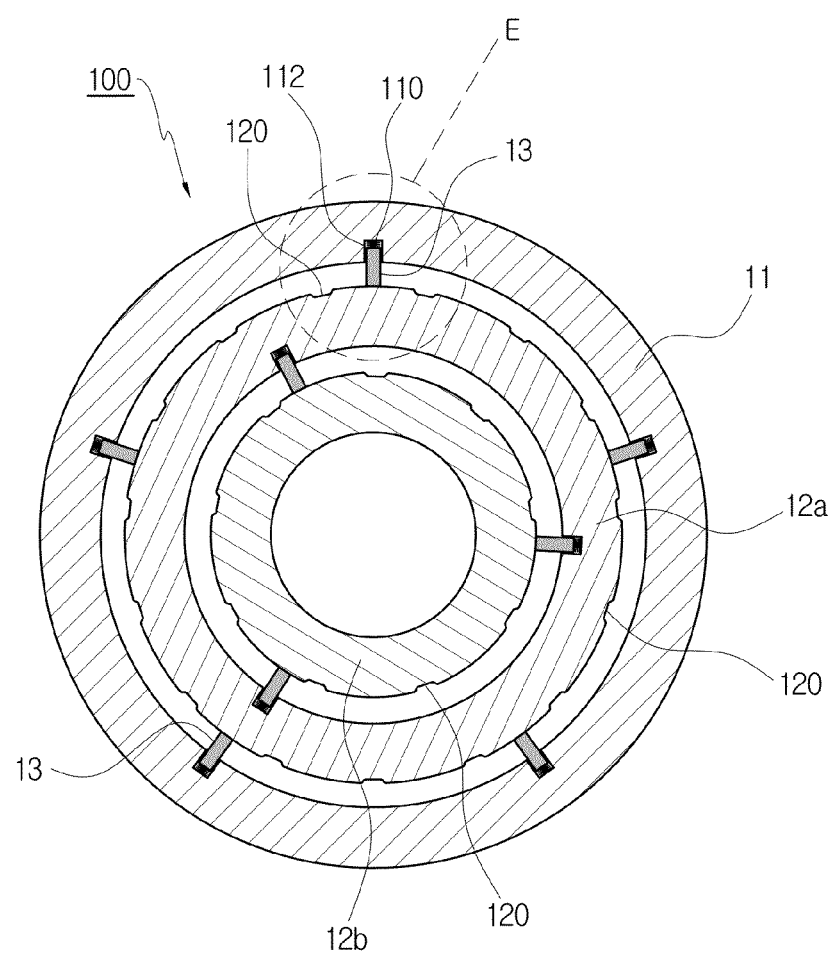
FIG. 9 is a schematic sectional view corresponding to FIG. 4, where a first middle nozzle is rotated in the state of FIG. 4.

In particular, since the dividing member 13 is configured to be shrinkable and expandable in a radial direction in the nozzle 100 of the present invention as described above, the location of the dividing member 13 may be changed by rotating the middle nozzle 12, and accordingly a fiber arrangement may be easily changed along the circumference in each fiber distribution layer. FIG. 9 is a schematic sectional view corresponding to FIG. 4, where the first middle nozzle 12a is rotated in the state of FIG. 4, and FIG. 10 is a schematic enlarged view showing the circular E portion of FIG. 9.

Figure 10:
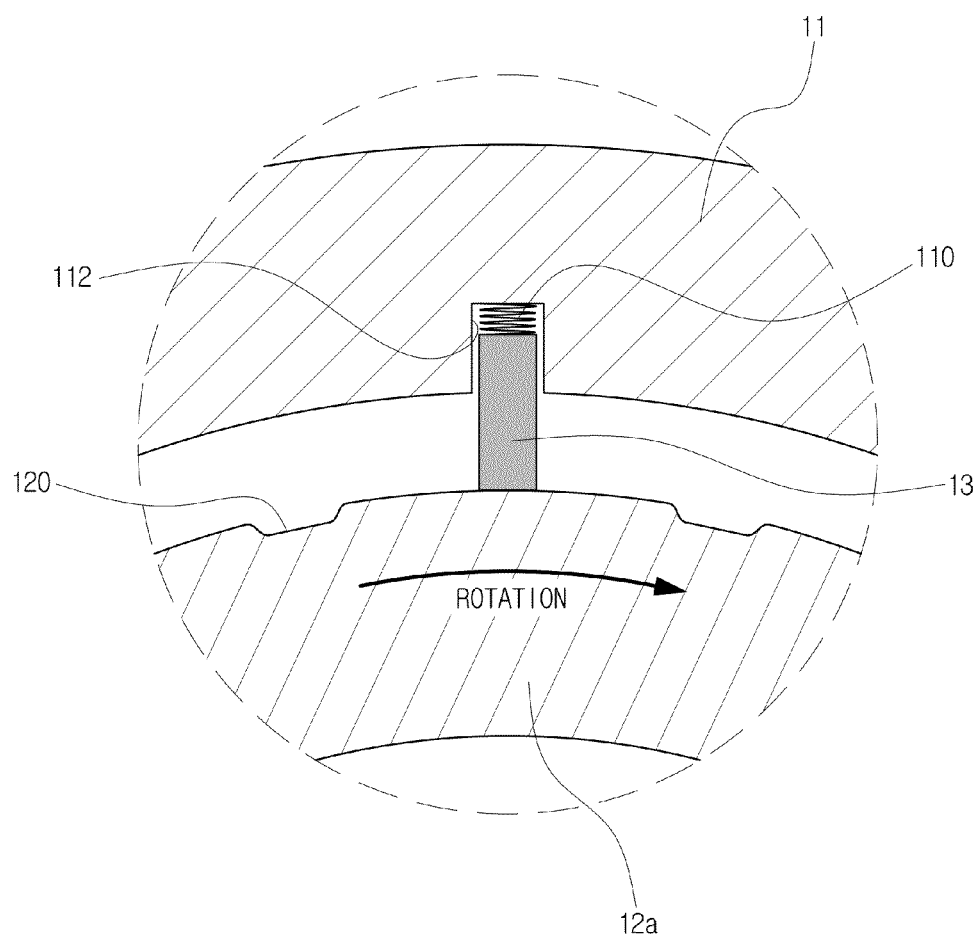
FIG. 10 is a schematic enlarged view showing the circular E portion of FIG. 9.

If the first middle nozzle 12a is rotated based on a direction in which fibers are input, as shown in FIGS. 9 and 10, as the elastic member 110 is shrunken, one side of the dividing member 13 enters the insert groove 112 further, and the other end of the dividing member 13 located in the hooking groove 120 deviates from the hooking groove 120. If the first middle nozzle 12a is rotated further in the same direction so that the other end of the dividing member 13 is located at a new hooking groove 120 adjacent thereto, the dividing member 13 is pushed in an opposite direction due to the elastic force of the elastic member 110 as shown in FIGS. 4 and 5 so that the other end of the dividing member 13 enters a new hooking groove 120 adjacent thereto.

In the present invention, the location of the dividing members 13 may be changed by rotating a middle nozzle 12 as described above, and the location of the dividing members 13 may also be changed by rotation between the middle nozzles 12.

Figure 11:
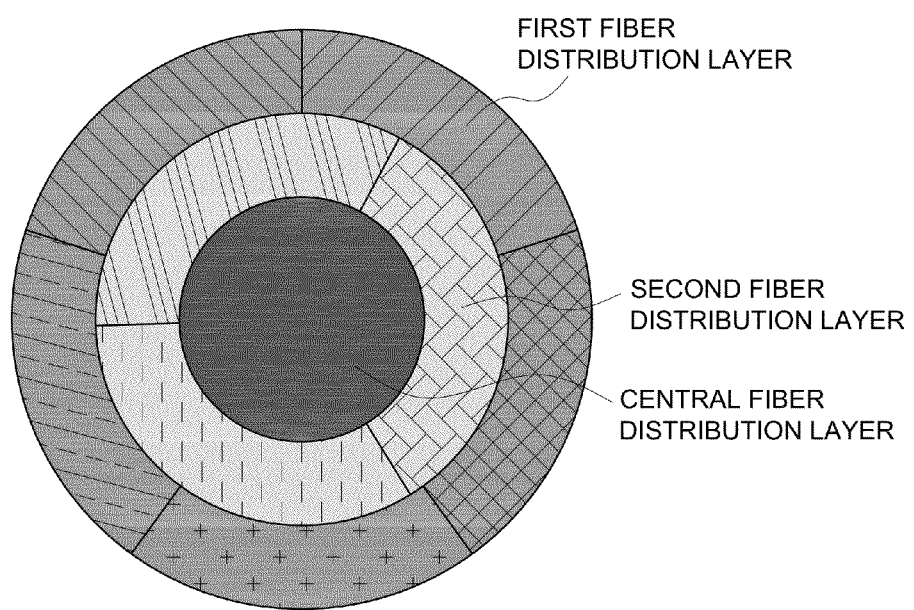
FIG. 11 is a schematic sectional view corresponding to FIG. 8, showing a sectional configuration of a hybrid FRP bar manufactured by rotating the nozzle to change a location of a dividing member.

FIG. 11 is a schematic sectional view corresponding to FIG. 8, showing a sectional configuration of a hybrid FRP bar manufactured by rotating the nozzle as shown in FIGS. 9 and 10 to change a location of the dividing member. If the location of the dividing member 13 is changed, a location where fibers are input is changed, and thus a pattern in which fibers are distinguishably distributed along the circumference in a single fiber distribution layer is changed. FIGS. 8 and 11 show a sectional configuration of the hybrid FRP bar manufactured according to the present invention, and if the nozzle is rotated as shown in FIGS. 9 and 10, a sectional configuration of the hybrid FRP bar as shown in FIG. 11 having a fiber distribution different from that of FIG. 8 may be obtained.

As described above, even though fibers are distinguishably distributed in a plurality of layers in the section of the hybrid FRP bar 1, by rotating the middle nozzle 12 to change the location of the dividing member 13, a pattern where different kinds of fibers are distributed in divided regions in a circumference direction in each fiber distribution layer may be easily obtained as desired.

Even though it has been illustrated that the insert groove 112 is formed in the inner surface of the outer nozzle 11 and the hooking groove 120 is formed in the outer surface of the first middle nozzle 12*a*, the present invention is not limited thereto, and it is also possible that the hooking groove 120 is formed in the inner surface of the outer nozzle 11 and the insert groove 112 is formed in the outer surface of the first middle nozzle 12*a*. This may also be identically applied to the middle nozzles 12.

Meanwhile, even though it has been described that the hybrid FRP bar manufactured in the present invention has a circular section, the present invention is not limited thereto but may have an oval shape, a polygonal shape or other various sectional shapes, and the sectional shape of the nozzle may also change accordingly. Therefore, in this specification, the term "circumferential direction" should be understood as meaning a direction along which a closed line is drawn in the section of the hybrid FRP bar. In addition, the term "radial direction" should be understood as meaning a direction directed from the sectional center of the hybrid FRP bar to an outer side.

As described above, according to the present invention, a hybrid FRP bar may be manufactured using at least two kinds of fibers which are distributed at specific locations of the section of the FRP bar as designed. Therefore, a fiber having a great elongation rate is distributed at an inner region of the hybrid FRP bar, and a fiber having a small elongation rate is distributed at an outer region of the hybrid FRP bar. In this way, it is possible to very easily manufacture a hybrid FRP bar with excellent performance, which does not cause great bending deflection when being used for a bending member.

What is claimed is:

1. A manufacturing apparatus for a rod-shaped fiber reinforced polymer (FRP) bar composed of a fiber and resin, the manufacturing apparatus comprising a fiber winding reel, a resin supplier, a nozzle and a drawer,
    wherein the nozzle includes an outer nozzle, a first middle nozzle and a second middle nozzle;
    wherein the first middle nozzle is disposed inside the outer nozzle with an interval, and then the second middle nozzle is disposed inside inlet of the first middle nozzle with an interval;
    wherein the inlet of the outer nozzle through which a fiber enters has a greater sectional area than the outlet of the outer nozzle through which a fiber is drawn out;
    wherein the inlet of the first middle nozzle through which a fiber enters has a greater sectional area than the outlet of the first middle nozzle through which a fiber is drawn out;
    wherein the inlet of the second middle nozzle through which a fiber enters has a greater sectional area than the outlet of the second middle nozzle through which a fiber is drawn out;
    wherein dividing members are disposed at an interval between the outer nozzle and the first middle nozzle and an interval between the first middle nozzle and the second middle nozzle;
    wherein the dividing members are made of a plate member with a predetermined thickness;
    wherein a concave insert groove is formed in the inner surface of the outer nozzle;
    wherein an elastic member made of a spring is provided in the insert groove of the outer nozzle;
    wherein one side of the dividing member provided between the first middle nozzle and the outer nozzle is coupled to the elastic member and inserted into the insert groove of the outer nozzle;
    wherein the other end of the dividing member provided between the first middle nozzle and the outer nozzle is oriented toward the outer surface of the first middle nozzle;
    wherein a concave hooking groove is formed in the outer surface of the first middle nozzle which contacts the other end of the dividing member so that the other end of the dividing member coupled to the outer nozzle is located in the concave hooking groove;
    wherein a plurality of concave hooking grooves are formed in the outer surface of the first middle nozzle along a circumference of the first middle nozzle at intervals, and the hooking groove formed in the outer surface of the first middle nozzle have a curved inner surface;
    wherein a concave insert groove is formed in the inner surface of the first middle nozzle;
    wherein an elastic member made of a spring is provided in the insert groove of the first middle nozzle;
    wherein one side of the dividing member provided between the first middle nozzle and the second middle nozzle is coupled to the elastic member and inserted into the insert groove of the first middle nozzle;
    wherein a concave hooking groove is formed in the outer surface of the second middle nozzle which contacts the other end of the dividing member so that the other end of the dividing member coupled to the first middle nozzle is located in the concave hooking groove;
    wherein a plurality of concave hooking grooves are formed in the outer surface of the second middle nozzle along a circumference of the second middle nozzle at intervals, and the hooking groove formed in the outer surface of the second middle nozzle have a curved inner surface;
    wherein a fiber is supplied through a central hole of the second middle nozzle located at an innermost side, a fiber is supplied through regions divided in a circumferential direction by the dividing member in the interval of the first and second middle nozzles, and a fiber is supplied through a region divided in a circumferential direction by the dividing member in the interval between the first middle nozzle and the outer nozzle and in the interval between the first middle nozzle and the second middle nozzle, thereby manufacturing a hybrid FRP bar having a section in which the fibers form a greater number of fiber distribution layers from a center of the FRP bar to the outside and are also distinguishably distributed in each fiber distribution layer in a circumferential direction; and
    wherein if the location of the dividing member is changed by a rotation of the middle nozzle, a hybrid FRP bar is manufactured so that locations of a plurality of regions divided in a circumferential direction in each fiber distribution layer are changed.

2. A nozzle for manufacturing a rod-shaped fiber reinforced polymer (FRP) bar composed of a fiber and a resin,
    wherein the nozzle comprises an outer nozzle, a first middle nozzle and a second middle nozzle;

wherein the first middle nozzle is disposed inside the outer nozzle with an interval, and the second middle nozzle is disposed inside inlet of the first middle nozzle with an interval;

wherein the inlet of the outer nozzle through which a fiber enters has a greater sectional area than the outlet of the outer nozzle through which a fiber is drawn out;

wherein the inlet of the first middle nozzle through which a fiber enters has a greater sectional area than the outlet of the first middle nozzle through which a fiber is drawn out;

wherein the inlet of the second middle nozzle through which a fiber enters has a greater sectional area than the outlet of the second middle nozzle through which a fiber is drawn out;

wherein dividing members are disposed at an interval between the outer nozzle and the first middle nozzle and an interval between the first middle nozzle and the second middle nozzle;

wherein the dividing members are made of a plate member with a predetermined thickness;

wherein a concave insert groove is formed in the inner surface of the outer nozzle;

wherein an elastic member made of a spring is provided in the insert groove of the outer nozzle;

wherein one side of the dividing member provided between the first middle nozzle and the outer nozzle is coupled to the elastic member and inserted into the insert groove of the outer nozzle;

wherein the other end of the dividing member provided between the first middle nozzle and the outer nozzle is oriented toward the outer surface of the first middle nozzle;

wherein a concave hooking groove is formed in the outer surface of the first middle nozzle which contacts the other end of the dividing member so that the other end of the dividing member coupled to the outer nozzle is located in the concave hooking groove;

wherein a plurality of concave hooking grooves are formed in the outer surface of the first middle nozzle along a circumference of the first middle nozzle at intervals, and the hooking groove formed in the outer surface of the first middle nozzle have a curved inner surface;

wherein a concave insert groove is formed in the inner surface of the first middle nozzle;

wherein an elastic member made of a spring is provided in the insert groove of the first middle nozzle;

wherein one side of the dividing member provided between the first middle nozzle and the second middle nozzle is coupled to the elastic member and inserted into the insert groove of the first middle nozzle;

wherein a concave hooking groove is formed in the outer surface of the second middle nozzle which contacts the other end of the dividing member so that the other end of the dividing member coupled to the first middle nozzle is located in the concave hooking groove;

wherein a plurality of concave hooking grooves are formed in the outer surface of the second middle nozzle along a circumference of the second middle nozzle at intervals, and the hooking groove formed in the outer surface of the second middle nozzle has a curved inner surface;

wherein a fiber is supplied through a central hole of the second middle nozzle located at an innermost side, a fiber is supplied through regions divided in a circumferential direction by the dividing member in the interval of the first and second middle nozzles, and a fiber is supplied through a region divided in a circumferential direction by the dividing member in the interval between the first middle nozzle and the outer nozzle and in the interval between the first middle nozzle and the second middle nozzle, thereby manufacturing a hybrid FRP bar having a section in which the fibers form a greater number of fiber distribution layers from a center of the FRP bar to the outside and are also distinguishably distributed in each fiber distribution layer in a circumferential direction; and wherein if the location of the dividing member is changed by a rotation of the middle nozzle, a hybrid FRP bar is manufactured so that locations of a plurality of regions divided in a circumferential direction in each fiber distribution layer are changed.

\* \* \* \* \*